United States Patent
Buehler et al.

(10) Patent No.: US 8,792,566 B2
(45) Date of Patent: Jul. 29, 2014

(54) METHOD AND APPARATUS FOR DIGITAL DATA TRANSMISSION

(75) Inventors: Ernst Buehler, Losone (CH); Reto Knaak, Ascona (CH); Rino D'Amario, Sigirino (CH)

(73) Assignee: AGIE Charmilles SA, Losone (CH)

( * ) Notice: Subject to any disclaimer, the term of this patent is extended or adjusted under 35 U.S.C. 154(b) by 142 days.

(21) Appl. No.: 13/426,124

(22) Filed: Mar. 21, 2012

(65) Prior Publication Data

US 2012/0243620 A1 Sep. 27, 2012

(30) Foreign Application Priority Data

Mar. 22, 2011 (EP) ..................................... 11159116

(51) Int. Cl.
*H04B 3/00* (2006.01)
*H04L 25/00* (2006.01)

(52) U.S. Cl.
USPC .......................................... 375/257; 375/222

(58) Field of Classification Search
USPC ........................................................ 375/257
See application file for complete search history.

(56) References Cited

U.S. PATENT DOCUMENTS

| | | | | | |
|---|---|---|---|---|---|
| 4,783,807 | A | * | 11/1988 | Marley | 704/235 |
| 5,157,727 | A | * | 10/1992 | Schloss | 704/213 |
| 5,438,178 | A | | 8/1995 | Buhler et al. | |
| 6,252,191 | B1 | | 6/2001 | D'Amario | |
| 2005/0038615 | A1 | * | 2/2005 | Kobalka et al. | 702/69 |
| 2007/0027570 | A1 | | 2/2007 | Buhler et al. | |

FOREIGN PATENT DOCUMENTS

| | | |
|---|---|---|
| EP | 0578018 B1 | 3/1997 |
| EP | 0920943 B1 | 9/2003 |
| EP | 1749609 B1 | 10/2010 |

* cited by examiner

*Primary Examiner* — Erin File
(74) *Attorney, Agent, or Firm* — Bachman & LaPointe, P.C.

(57) ABSTRACT

An expansion of known serial data links, for example ETHERNET, published in IEEE802.3, for directly transmitting random events without having to carry out synchronization with a clock signal or having to wait for a cyclical transmission time. Two different, random events are represented using two differently coded individual pulses and are transmitted in an event-controlled manner. A jitter-free latency of 45 ns between the event and its reception is possible over a line length of 8 m, for example. The expansion is particularly suitable for the short, digital data links between a node and a plurality of modules, as are required in modern electrical discharge machines, machine tools and similar electronic systems.

16 Claims, 3 Drawing Sheets

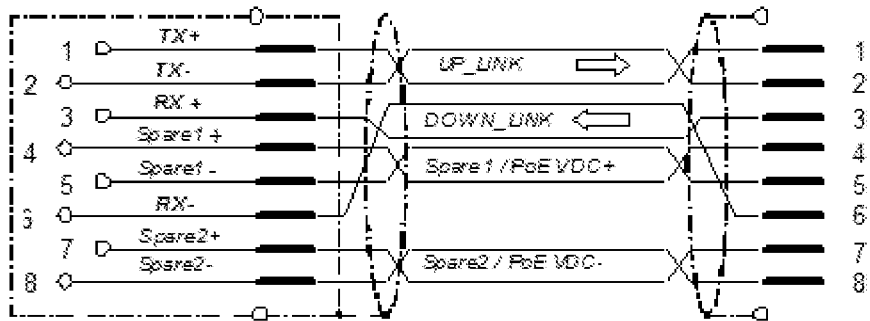
Fig 3   Prior art
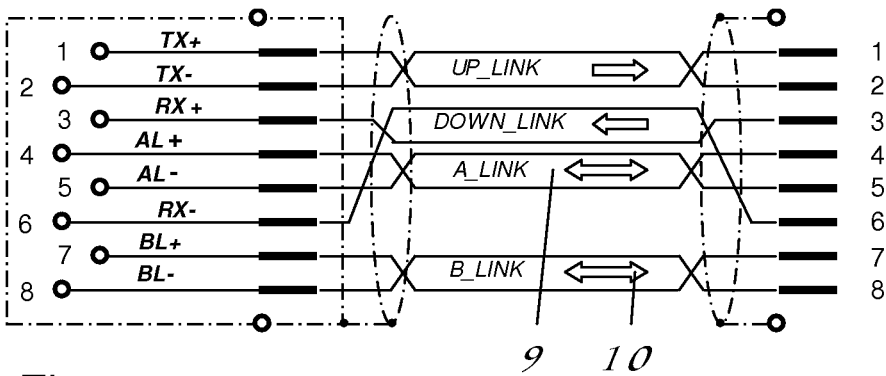
Fig 4
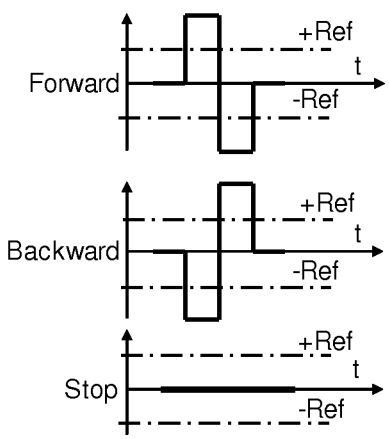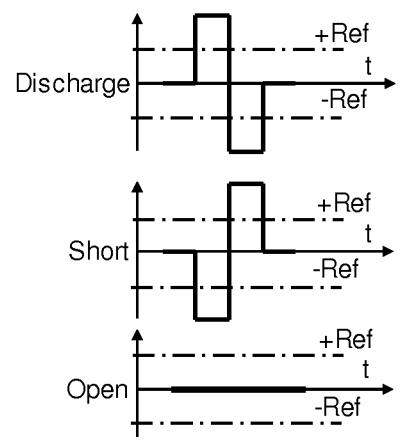
Fig 5              Fig 6

METHOD AND APPARATUS FOR DIGITAL DATA TRANSMISSION

The invention relates to a method and an apparatus for digital data transmission via a data cable having a plurality of twisted conductor pairs in machine tools and similar electronic systems.

BACKGROUND OF THE INVENTION

For (rapid) digital data transmission over short distances, that is to say distances of a few meters or centimeters, conductors are often used in a parallel arrangement and in countless variants.

One application concerns, for example, parallel buses (data transmission paths) on motherboards of personal computers (PC), to which a plurality of daughter boards can be connected in a parallel manner. Such buses usually have a length of less than 300 mm and may have more than 100 parallel conductors, for example ISA bus, PC104 bus, PCI bus, or else numerous proprietary buses without compulsory standards.

Another example concerns data transmission over distances of several meters. Multicore screened cables are used in the prior art for rapid parallel data transport between devices such as PCs and printers or measuring devices. Typical examples are: the PC parallel port, Centronics/IEEE-1284, the IEEE-488/IEC-625 instrument bus or else all industrial control systems with multicore ribbon cables.

The common feature of these parallel data transmission operations is the high degree of complexity in the transmitting and receiving sections and the large number of parallel lines needed for the transmission cable. Typical characteristics of parallel conductors are their considerable susceptibility to faults as a result of electromagnetic fields, crosstalk and propagation time differences between the parallel conductors. The inflexibility in terms of the degree of expansion relating to the data bus width, the address range and the transmission rate is particularly troublesome in some cases.

For these reasons, serial data transmission was widely used. Virtually only the serial principle is possible in many applications during wireless transmission via radio or light waves or else during wired transmission via telecommunication lines.

Many serial data transmission protocols, such as PCI-Express, ETHERNET, EtherCAT, Powerlink, USB, or industrial field buses, for instance Profibus, Device-Net or CANopen, have become established in the respective fields of application and have been published in corresponding standards.

Serial data transmission has simplified and reduced the cost of digital data traffic. Different coding and checking methods guarantee secure and robust links. The possibility of some coding methods, for example also the Manchester coding method mentioned below, extracting the clock signal from the data stream solves the propagation time problems over any desired transmission paths and distances.

A high degree of flexibility for the number of bus subscribers, the data width, the address ranges, the transmission media, the transmission distance and the transmission direction is provided for many of these methods.

However, a particular problem arises when using serial digital data transmission operations over short distances in machine tools and similar electronic systems if randomly occurring events have to be handled in arbitrary subassemblies of the machine (virtually) without a time delay.

Although solutions, for instance EtherCat and Powerlink, are known for cyclically synchronizing different modules, for example drive shafts, with one another, no usable approaches are known for the stochastic operations.

The European patent specification EP 1 749 609 B1 discloses consistent modularization of the subassemblies in machine tools, in particular in electrical discharge machines. Starting from a central communication node, the modules are networked in a star configuration via ETHERNET-like data links and are also supplied with DC voltage via the data cables up to a power of 50 W. Power is supplied, for example, according to the Power over ETHERNET standard, or PoE for short, which is similar to the IEEE802.3af standard.

The communication node additionally has at least one standard ETHERNET data link according to IEEE802.3 which allows any desired long-distance links to the outside world.

Such a machine tool in the end no longer requires an electrical cabinet and can be expanded or modified at any time. Remote diagnoses, configurations and software updates can be conveniently carried out via the Internet. The modules are directly installed at their place of action in the machine tool in order to keep losses produced when transmitting power as low as possible.

Three priorities for data processing and data transmission are proposed in EP 1 749 609 B1 as further information for configuring the internal, ETHERNET-like links LINK:
  TOP priority: parallel processing only inside a module,
  SECOND priority: between modules, via the network node and preferably parallel data processing,
  THIRD priority: sequential data processing is preferred between modules and the network node and to external, superordinate systems.

As mentioned at the outset, ETHERNET derivatives such as EtherCAT, Powerlink, Profinet and Modbus TCP/IP have furthermore been disclosed for real-time applications. These involve particular precautions in the transmitting method in order to guarantee a maximum permissible latency for a deterministic (predictable) behaviour. For this purpose, a time stamp according to IEEE1588 is concomitantly transmitted in the data packets, for example, in order to allow precise temporal synchronization of a plurality of bus subscribers.

However, all of these known solutions have the common disadvantage that they cannot immediately react to temporally random operations. The transmission of a data packet must always be initiated or awaited in order to transmit an item of information, and the event must also be synchronized with the local clock rates in each case.

For an EtherCAT link with a Cat. 5 cable according to the EIA/TIA-568 standard and the maximum bandwidth of 100 MHz for example, this now results in a time delay of at least 10 µs and considerable jitter (temporal unsharpness). Since a sensor and an actuator are usually involved in the operation and likewise result in a certain time delay in the data processing, this time delay before it is possible to react to a stochastic event may double to more than 20 µs, for example.

Although the faster Cat. 6 cables according to the EN50288 standard, with a maximum bandwidth of 250 MHz, or Cat. 6a links at 500 MHz for Gigabit Ethernet according to IEEE802.3an could reduce this time delay before reacting to a stochastic event, they increase the system costs and the power losses in doing so.

Even with a bandwidth of 500 MHz and parallel transmission via four conductor pairs, delay times before reacting to a random event of approximately 2 µs could still be expected for the sensor/actuator case.

As soon as random operations or events which typically have to be processed in less than approximately 100 ns occur in a system, the synchronous, serial data transmission operations described above are generally overtaxed, for example.

Electrical discharge machines are particularly affected by this disadvantage since many process-related operations have a purely stochastic behaviour, for instance the ignition delay time of the processing pulses or process faults which should be detected during a processing pulse and should be eliminated by immediate measures. Some electrical discharge processes are based on weak, so-called preliminary or probing pulses which scan the state of the spark gap. Depending on the analysis result, a processing pulse or various other pulses, for instance for breaking open micro-short circuits or for cleaning via shockwaves, is/are released. However, this release must be carried out in less than approximately 100 ns since otherwise the method becomes futile because the measured properties of the spark gap are already no longer current (for example after 100 ns).

Similar problems occur in highly dynamic servo shafts with linear motors or piezo drives. Such systems are being used more and more often to stabilize processes after continuously detected, stochastic interference variables. Examples are: drive shafts in electrical discharge machines, the out-of-round turning in turning machines, the active damping of external vibrations in high-precision machines and the active suppression of chatter marks caused by the vibrations of cutting tools in cutting machine tools.

Actuating speeds of up to 10 m/s are not uncommon for this type of drive. However, this means that, in this case, the position changes by 1 μm in 100 ns. For micrometer accuracy, a limit of approximately 100 ns thus results for the delay time before taking countermeasures when stochastic events occur.

Errors of up to 20 μm should accordingly be expected for a delay time of 2 μs which, as mentioned above, would occur in the sensor/actuator case.

In comparison with the prior art, the invention is based on the object of developing a serial method and an apparatus for digital data transmission in such a manner that stochastic events can be analysed with little effort and little energy consumption and can be rapidly transmitted with little energy consumption.

SUMMARY OF THE INVENTION

According to a first aspect, the invention provides a method for rapid digital data transmission of stochastic events in a machine tool via a data cable having a plurality of twisted conductor pairs, at least one conductor pair of which is intended for serial data transfer. A further conductor pair is intended to transmit stochastic events. A stochastic event is signalled by an individual pulse transmitted without a clock, the individual pulse being able to be a positive pulse or a negative pulse, and a positive pulse signalling a first stochastic event, a negative pulse signalling a second stochastic event and the absence of an individual pulse signalling no event.

According to a second aspect, the invention provides an apparatus for digital data transmission of stochastic events in a machine tool via a data cable having a plurality of twisted conductor pairs, at least one conductor pair of which is intended for serial data transfer. At least one further conductor pair is intended to transmit stochastic events. A transmitting device is provided and coupled at least at one end of the data cable and a receiving device is provided and coupled at an opposite end of the data cable, which transmitting and receiving devices are connected to associated logic circuits. For signalling stochastic events, the at least one transmitting device is designed in such a manner that it transmits individual pulses without a clock, an individual pulse being able to be a positive pulse or a negative pulse, and a positive pulse signalling a first stochastic event, a negative pulse signalling a second stochastic event and the absence of an individual pulse signalling no event, and the at least one receiving device for receiving the individual pulses being designed in such a manner that it can detect the three states "positive pulse", "negative pulse" and "no event".

According to a third aspect, the present invention provides an electrical discharge machine comprising: a central node, a plurality of modules which are designed and intended to control the electrical discharge machine, and at least one data cable. The data cable connects at least one module to the central node. The electrical discharge machine has an apparatus according to the second aspect and/or is set up to carry out a method according to the first aspect.

Further aspects of the present invention are explained in the subordinate claims, the drawings and the following description.

BRIEF DESCRIPTION OF THE DRAWINGS

Preferred embodiments of the invention are explained in more detail below with reference to the accompanying drawings, in which:

FIG. 3 shows the standardized configuration of the known ETHERNET Cat. 5 cable for data rates of up to 100 Mbit/s.

FIG. 4 shows an embodiment with expansion according to the invention and configuration of a Cat. 5 cable with two bidirectional transmission channels for random events.

FIG. 5 shows an embodiment with individual pulse coding of two discrete events for controlling and/or reporting the position of drive shafts.

FIG. 6 shows an embodiment with individual pulse coding of two discrete events for detecting the state of the spark gap of electrical discharge machines.

DETAILED DESCRIPTION

Figure 1:
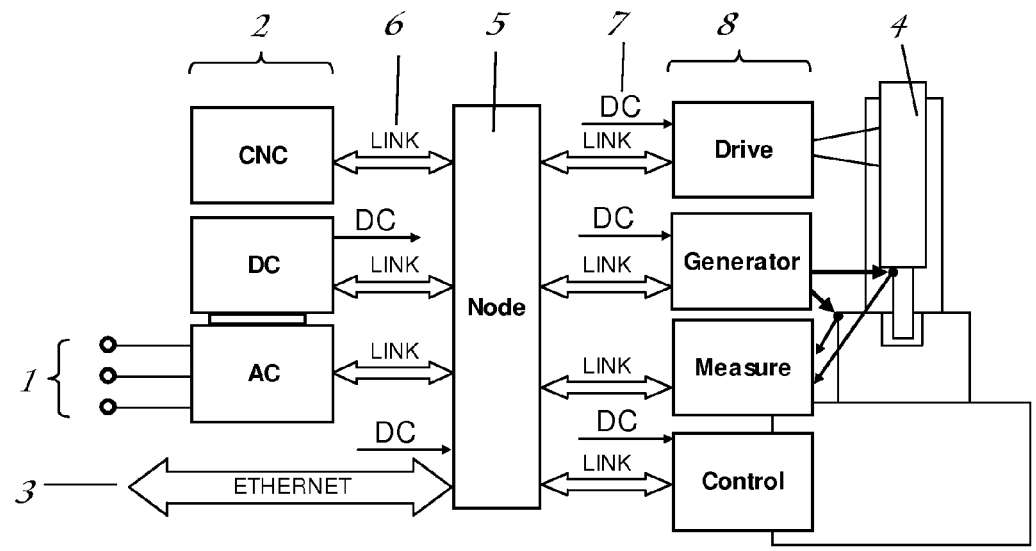
FIG. 1 shows a typical modular design and modular cabling of the electronics using the example of an electrical discharge machine.

FIG. 1 shows an embodiment with a typical modular design and modular cabling of the electronics using the example of an electrical discharge machine 4.

The electrical discharge machine 4 is supplied with energy via an AC mains input 1. The modules 2 for the AC input AC, DC voltage regulator DC and numerical controller CNC are accommodated in a console or electrical cabinet.

A node 5 (Node) is provided as the control centre for the machine-internal data traffic via serial data links 6 (LINK) arranged in a star configuration. Connected modules 8 can be directly supplied with a DC voltage of typically 48 VDC, up to a power of approximately 50 W in each case, via the serial data links 6 designated "LINK". As mentioned above, power is supplied in this case, for example, via the Power over Ethernet (PoE) standard which is similar to the IEEE802.3af standard.

In this case, the modules 8 are, for example, modules which are designed to drive a motor ("Drive"), to generate processing pulses ("Generator"), to measure ("Measure") and to control.

DC voltage cables 7 ("DC") with a DC voltage of +/−280 VDC, for example, are provided for higher-power modules 8 (Drive, Generator and Control) installed in the electrical discharge machine 4. The DC voltage cables 7 start from the DC voltage regulator DC and are likewise connected in a star configuration, via the node 5, to the modules 8 to be accordingly supplied. This connection allows energy to be interchanged in an unimpeded manner between the connected modules 8. A module 8 for measuring purposes (Measure) typically does not require a DC voltage cable 7 but rather is supplied with electrical energy via PoE.

A standardized ETHERNET control connection 3 which makes it possible to communicate with the outside world, for example with a corporate network (for example a LAN or WLAN), or even via the Internet is also provided.

In some embodiments, machine-internal communication via the data links 6 (LINK) can be carried out in a highly simplified manner since only one bus subscriber is ever connected and neither an addressing operation nor complex data packet management is therefore required. So-called plug & play identification methods make it possible to flexibly connect any desired modules 8, which, in some embodiments, may be important for a customer-specific design or subsequent expansions.

The data link 6 (LINK) is a starting point of the present invention. Its method of operation is explained in more detail below.

Figure 2:
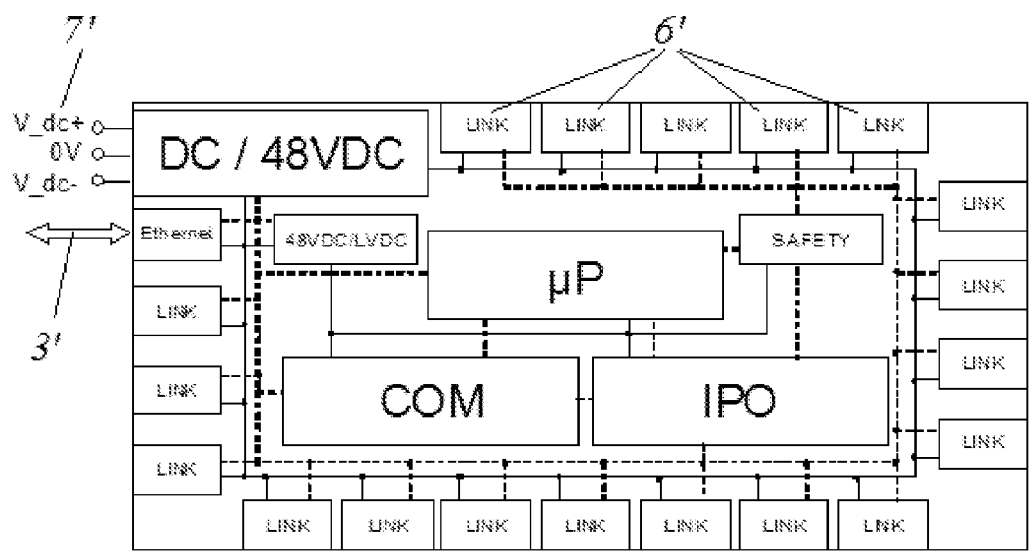
FIG. 2 shows a central node with an ETHERNET data link and configurable, serial data channels LINK, known from EP 1 749 609 B1.

FIG. 2 shows a central node having an ETHERNET data link 3' and a large number of structurally identical but configurable serial data links 6' (LINK), as is known from EP 1 749 609 B1, for example. In some embodiments, the central node 5 may in this case correspond to the node shown in FIG. 2 and disclosed in EP 1 749 609 B1.

In the case of this node, a DC voltage connection 7' ensures the basic supply for the entire system with a typical voltage of 48 VDC via the DC voltage converter DC/48V. This voltage supplies all data links LINK and Ethernet as well as a voltage regulator 48 VDC/LVDC which provides the lower voltages for the electronic components µP, COM, IPO and SAFETY.

The block COM is responsible for communication, typically has a programmable logic circuit and corresponds to a logic circuit (11, FPGA_N, in FIG. 7), as is also used in some embodiments of the invention.

Parallel data processing has the advantage that the processing speed is always the same irrespective of the complexity.

The blocks µP, IPO and SAFETY are not described any further here since they are not directly important to the present invention and are described in detail in EP 1 749 609 B1, for example.

FIG. 3 shows the standardized configuration of the known ETHERNET Cat. 5 cable for data rates of up to 100 Mbit/s, as is also used in some embodiments. Only the conductor pairs TX+, TX−, which together form an UP_LINK, and the conductor pairs RX+, RX−, which together form a DOWN_LINK, are usually always configured. In this embodiment, the conductor pairs TX+, TX− of the UP_LINK form the data path from the node 5 to a module 8 and the conductor pairs RX+, RX− of the DOWN_LINK form the data path from a module 8 back to the node 5, with the result that bidirectional transmission is possible overall.

The selection of the plug connections "3" and "6" for the conductor pair RX+, RX− (DOWN_LINK) is not in the order 3 and 4 (and is thus illogical) for historical reasons (telephony). However, non-observance of this special feature in the order and, for example, configuration in the order of the connections "1" to "8" results in poor transmission quality in some embodiments on account of coupled conductor pairs.

The conductor pairs which are denoted Spare1 ("4" and "5") and Spare2 ("7" and "8") are normally not configured. However, there is an exception. In a variant of Power over Ethernet (PoE) according to IEEE802.3af for example, the DC voltage supply PoE VDC+ and PoE VDC− is directly conducted via these two conductor pairs.

Thanks to twisted conductor pairs, this type of data cable, for example, can provide better compensation for magnetic interference fields in comparison with normal ribbon cables and, thanks to the common screening into the plug region, can also provide better compensation for electrical interference fields.

The propagation speed via Cat. 5 cables is comparatively high. It typically reaches 72% of the speed of light, or 216 m/µs, which will be discussed in yet more detail using FIGS. 8 and 9.

FIG. 4 uses an embodiment to show the principle of the expansion according to the invention and configuration of a Cat. 5 cable with two additional, asynchronous transmission channels 9, 10 ("AL+" and "AL−" and "BL+" and "BL−") which are also referred to as A_LINK and B_LINK and are intended to transmit random events or to transmit data representing random events.

These two transmission channels 9 and 10 are dynamically configurable, that is to say what and the direction in which something is transmitted can be redefined at any time using the serial data channels UP_LINK and DOWN_LINK. In contrast to the serial channels UP_LINK, DOWN_LINK, each channel for random events 9, 10, A_LINK, B_LINK can be alternately operated in both directions (half-duplex). This is explained below using FIGS. 8 and 9.

With this expansion, the mentioned variant of DC voltage transmission according to IEEE802.3af in the A_LINK and B_LINK channels naturally becomes obsolete in some embodiments.

FIG. 5 shows the principle of individual pulse coding of two discrete events for controlling or reporting the position of drive shafts, as used in some embodiments.

Individual pulse coding is based on the known Manchester coding. Therefore, the principle of Manchester coding is of such interest for some embodiments because the Manchester-coded data stream in principle does not have a DC voltage component. Therefore, inductive or capacitive coupling components are virtually never saturated. In addition, the clock rate can be reconstructed from the data stream.

In some embodiments, the first property is of particular interest and the individual pulses used are accordingly coded. In some embodiments, however, the fact that three states can be signalled in individual pulses also becomes important, namely: no signal, that is to say an individual pulse is not transmitted (basic state), a signal with a positive half-cycle at the start (also called a positive pulse below) (first event), and a signal with a negative half-cycle at the start (also called a negative pulse below) (second event).

In some embodiments for a drive shaft for example, this can be used for the desired value and actual value transmission in the form of travel increments (Forward, Backward, Stop) via the conductor pairs A_LINK and B_LINK, as described below.

The stochastic event "Forward" is signalled, for example, by a positive individual pulse (top of FIG. 5). A negative pulse directly follows the positive pulse in order to prevent, like in Manchester coding, a DC voltage component from being produced and resulting in undesirable charging. The stochastic event "Backward" is signalled by a negative pulse which is followed by a positive individual pulse in order to again suppress the production of a DC voltage component. The stochastic event "Stop" can be recognized by virtue of the fact that an individual pulse is not transmitted.

In the embodiments, the individual pulses may have a defined width and height (amplitude) so that they can be distinguished from interference signals, for example.

In contrast to the known Manchester coding in which a clock signal runs without interruption, a non-stop continuous clock signal is not used to transmit the individual pulses, but rather the individual pulses are transmitted without a clock. A pulse shaper shapes an individual pulse, for example in response to a stochastic event, which individual pulse is immediately transmitted via the associated line. The clock-free transmission makes it possible to avoid corresponding delays which are produced at the outset in connection with the bandwidth of, for example, 100 MHz or even 500 MHz in typical Cat. 5 and Cat. 6 cables.

Figure 7:
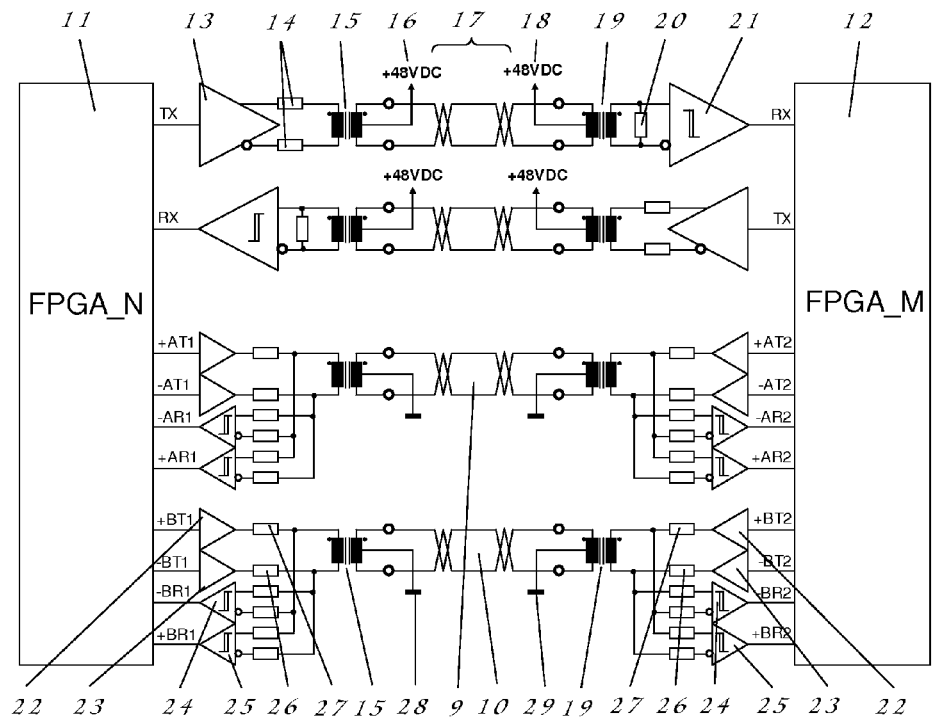
FIG. 7 shows an embodiment with modular, serial data transmission LINK between the node and a module.

In the simplest case, the positive and negative pulses are detected using fixed references +Ref, −Ref and are forwarded to logic circuits 11, 12, which are also referred to as FPGA_N, FPGA_M in FIG. 7, in the form of the digital signals −AR1, +AR1, −AR2, +AR2, −BR1, +BR1, −BR2 and +BR2. In this case, the fixed references are used, for example, as the triggering threshold for a differential receiver, as is explained in more detail below in connection with FIG. 7. In this case, the stochastic events form the desired value and actual value transmission in the form of travel increments (Forward, Backward, Stop).

For greater immunity to interference pulses, additional voltage and time reference measuring windows may be defined in some embodiments in order to detect non-compliant signals.

For example, an erroneously received signal (individual pulse) can be detected by determining whether a signal or an individual pulse corresponds, in terms of its amplitude and/or duration, to the expected coded individual pulse.

FIG. 6 shows the principle of individual pulse coding of two discrete events for detecting the state of the spark gap of electrical discharge machines.

As discussed at the outset, the detection of the state of such a spark gap is particularly time-critical and is normally transmitted in the form of an analogue signal to the process control system and is quantized and analysed only there.

According to the invention, in some embodiments, the three states "Discharge" (discharge active), "Short" (short circuit active) and "Open" (idling active) quantized in situ (directly at the spark gap) are now transmitted via a conductor pair A_LINK (9, FIG. 4) or B_LINK (10, FIG. 4). In this case, these three states "Discharge", "Short" and "Open" occur as stochastic events.

In this case, a positive pulse signals the state "Discharge", a negative pulse signals the state "Short" and no individual pulse signals the state "Open". As explained in connection with FIG. 5, the positive/negative individual pulses are followed by corresponding pulses of opposite polarity in order to prevent the occurrence of a DC voltage component.

In this case, the transmission takes place, for example, from a corresponding module 8, for example "Measure", to the central node 5.

Both the corresponding module 8 and the central node 5 have a programmable logic circuit for this purpose, as explained further below in connection with FIG. 7.

In some embodiments, the reference levels and analysis methods for these three states may also be changed at any time using the serial transmission UP_LINK.

In some embodiments, these three states can be transmitted continuously (without a clock) and thus result in extremely quick, accurate and interference-free identification of the operations in the spark gap. In some embodiments, scanning rates of up to 100 million states per second via a single conductor pair A_LINK (9, FIG. 4) or B_LINK (10, FIG. 4) of a Cat. 5 cable are possible. In a corresponding manner, in some embodiments, 200 million states per second can be transmitted via both conductor pairs, for example via an 8 m cable with a typical latency of 45 ns per conductor pair.

FIG. 7 shows the principle of modular serial data transmission "LINK" between the node 5 and a module 2 or 8 in one embodiment. The central node 5 has a programmable logic circuit FPGA_N 11, which more or less corresponds to the block COM in FIG. 2 and serves a multiplicity of data links LINK 6, an individual one of which is illustrated in detail in FIG. 7.

The region TX, RX provided with reference symbols to 21 represents the serial bidirectional data link according to the IEEE802.3 standard to a programmable logic circuit FPGA_M 12, which is up to approximately 10 m away, in any desired module 2, for example in the electrical cabinet or module 8, in the electrical discharge machine 4.

The digital signal TX to be transmitted via the UP_LINK can be supplied, via a differential line driver 13, via line terminating resistors 14, a transmitting transformer 15, the Cat. 5 cable 17 corresponding to the data cable "LINK" (6 in FIG. 1), a receiving transformer and a differential receiver 21 with a terminating resistor 20, to the programmable logic circuit FPGA_M 12 of a module 2 or 8 in the form of a digital signal RX to be received. The DOWN_LINK is constructed in a correspondingly identical manner with the same components 13 to 21 but in the opposite direction.

As mentioned above in connection with FIG. 4, the A_LINK 9 and B_LINK 10 can be operated in the half-duplex method. For this purpose, positive differential receivers and negative differential receivers 25 which are continuously ready to receive are provided at both ends of the transmission paths of the data channels A_LINK 9 and B_LINK 10 for transmitting stochastic events. The positive differential receiver 24 can detect positive pulses, as described in connection with FIGS. 5 and 6, and the negative differential receiver 25 can detect negative pulses. The positive differential receiver 24 on the side of the programmable logic circuit 11 (FPGA_N) in the node 5 and the negative differential receiver 25 on the side of the programmable logic circuit 12 (FPGA_M) in the module 2 or 8 transmit the detected digital signals −AR1 (negative signal from the A_LINK in the node 5) to +BR2 (positive signal from the B_LINK in a module 2 or 8) to the corresponding programmable logic circuits FPGA_N 11, FPGA_M 12. In this case, the receivers 24 and 25 may be coupled to resistors in order to isolate the input capacitances and reactions of the receivers 24, 25 from the signal.

Since, as explained with respect to FIG. 5, the three states "no signal", "signal which is positive at the start" and "signal which is negative at the start" are intended to be transmitted as an individual pulse, two digital signals +AT1, −AT1 to +BT2, −BT2 from the corresponding programmable logic circuits FPGA_N 11, FPGA_M 12 must be respectively available to the positive line drivers 22 and negative line drivers 23. The fourth possible state "positive and negative signal" is cancelled since said state could no longer be distinguished from the state "no signal" in the receiver.

In some embodiments, differential line drivers similar to the above line driver 13, with an additional "Three-state" state (a high-impedance third state), could likewise be used in principle here. However, this third state is usually significantly slower and a high-impedance line termination is also absolutely undesirable, even for short lines, in some embodiments.

Line matching resistors 26 and 27 are respectively coupled between the transformers 15 and 19 and the transmitters 22, 23. In some embodiments, the line matching resistors 26 and 27 remain switched on during all three states according to the invention and thus guarantee a continuous line termination.

In an alternative embodiment, there is a variant in which the direct current, which is usually applied to the channels Spare1 and Spare2 (see above and FIG. 3) in the Cat. 5 cable, is passed to the receiver, that is to say to the module 2 or 8 for example, using all four conductor pairs, as illustrated in FIG. 7, in each case via centre taps 16, 18 and 28, 29 of the transmitting transformers 15 and receiving transformers 19. This additionally results in the advantage of all conductor pairs, which connect the transmitting transformers 15 to the receiving transformers 19, being at the potential of the 48 VDC supply and therefore not being able to be electrostatically charged.

This corresponds, in principle, to the future IEEE802.3at standard which is intended to provide a power of up to a maximum of 30 W over 100 m. Polarity correction with rectifier bridges in the receiver, as provided by the mentioned variant of IEEE802.3af, is not required here since the correct polarity is ensured at any time. This embodiment dispenses not only with the rectifier bridge but also with its voltage drop of approximately 2 V, which advantageously makes an additional power of 2 W available. A power of even more than 50 W can therefore be transmitted without any problems, depending on the selected cable cross section, because the length of the cable is at most 10 m.

With an unsupervised half-duplex method, data collisions naturally cannot be precluded in some embodiments. Damage to the data transmission devices should not be feared but consequential damage owing to incorrect information could be disastrous.

On account of the finite signal propagation times, data collisions may always be detected only too late, and so the unsupervised half-duplex method can be used only in special cases in some embodiments.

The supervised half-duplex method prevents data collisions by defining which transmitter is allowed to transmit when. In the simplest case, this can always be in one direction, as in the case of the state of a spark gap according to FIG. 6. There, the states "Discharge", "Short" and "Open" are transmitted to the central node 5 starting only from the module 8 "Measure".

Since individual incorrect transmission operations would not have any effects or would have only insignificant effects on the processing result, acknowledgement of each correctly received pulse is not worthwhile in this case. Nevertheless, a check in the receiver for statistics, diagnosis and reliability is advisable.

Speed and reliability have a negative effect on each other: a check or filtering must be carried out for reliability, which takes a certain time. Suitable methods for mitigating this restriction, which are used in some embodiments, are therefore proposed below.

Figure 8:
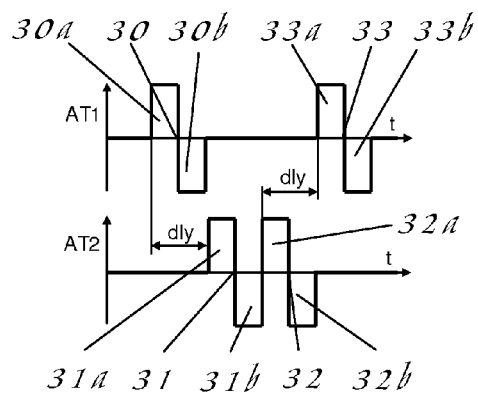
FIG. 8 shows an embodiment with fast and secure transmission of random events.

FIG. 8 shows an embodiment of a first principle of rapidly and reliably transmitting random events, the associated apparatus for transmitting random events corresponding substantially to the apparatus shown in FIG. 7.

It is assumed that FPGA_N 11 is intended to signal to FPGA_M 12, via the channel AT1 and a Cat. 5 cable having a length of 8 m, the state "positive pulse" in the form of a pulse 30 which is formed from a positive individual pulse 30a and a corresponding negative individual pulse 30b. As explained above, the negative individual pulse 30b is used to prevent the occurrence of a DC voltage component.

In order to shape the pulse 30, the FPGA_N (11, FIG. 7) for the time being activates the output +AT1 for a duration of 10 ns, for example, thus forming the positive individual pulse 30a, and the output −AT1 is immediately then activated for a duration of 10 ns, thus forming the negative individual pulse 30b. Activating the output +AT1 produces a rising edge of the individual pulse 30a and activating the output −AT1 produces a falling edge of the individual pulse 30b.

With a signal propagation speed of 216 m/μs, the combined pulse 30 arrives at the inputs +/−AR2 of the FPGA_M 12 (FIG. 7) as the pulse 31 (bottom of FIG. 8) after a delay of 37 ns as a result of the 8 m-long Cat. 5 cable and can be processed there immediately, that is to say virtually without a time delay. The pulse 31 is accordingly composed of the positive pulse 31a and the negative pulse 31b.

With a propagation speed of 216 m/μs, transmission over cables having a length of 8 m would therefore result in a time delay of only 37 ns. Added to this is a time delay of a few ns for the transmitters 22, 23, that is to say the positive and negative line drivers 22, 23 described above, and the receivers 24, 25, that is to say the positive and negative differential receivers 24, 25 described above, with the result that a stable latency dly of typically 45 ns results, as indicated in FIG. 8. This latency corresponds to the delay time of 37 ns as a result of transmission over the 8 m-long cable and an additional 8 ns for processing in the transmitters 22, 23 and receivers 24, 25.

In order to make this first principle reliable, the signal integrity is checked in some embodiments, as discussed above using FIG. 5. The check of the signal integrity using the amplitude and duration of a pulse lasts for 10 ns, for example. With a positive test result, an acknowledgement pulse 32 can be transmitted from the FPGA_M 12 back to the central node 5 or its FPGA_N 11 after the end of the received (combined) pulse 31. The acknowledgement pulse 32 is composed of a positive pulse 32a and a negative pulse 32b. This acknowledgement pulse 32 arrives, as the acknowledgement pulse 33, at FPGA_N 11 after a further latency dly. The acknowledgement pulse is likewise composed of a positive pulse 33a and a negative pulse 33b. Precisely a time of 2*dly, that is to say 2*45 ns=90 ns, lies between the end of the transmitted pulse 30 and the start of the received acknowledgement pulse 33. This latency can be additionally used to check the integrity of the transmission path.

With a negative test result, no acknowledgement pulse 32 is returned. In an alternative embodiment, an acknowledgement pulse of opposite polarity is returned in order to signal the negative test result and thus the transmission error. In this case, the processing of the event which has already taken place must naturally be reversed or corrected.

This reliable transmission, including verification, thus lasts 2*45 ns+4*10 ns=130 ns, if it is assumed that verification requires 10 ns. A new event can then be signalled, which allows a maximum total of 7.69 million events per second. This corresponds, for example, to the control of a drive shaft at a maximum speed of 7.69 m/s with a travel resolution of 1 μm.

A further variant of this first principle provides for the further processing to be enabled only after a successful test. Although the latency is thereby increased to 45 ns+2*10 ns=65 ns, the corrections in the event of an error are dispensed with. The transmission duration naturally remains unchanged at 130 ns.

Figure 9:
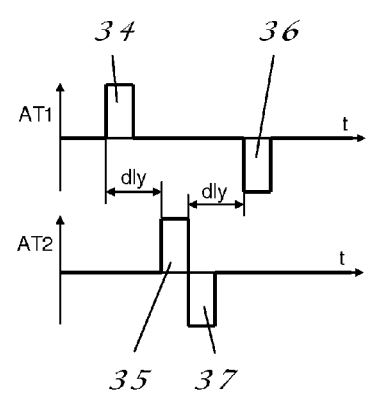
FIG. 9 shows another embodiment with fast and secure transmission of random events.

FIG. 9 shows an embodiment of a second principle of even faster transmission of random events. This second principle is somewhat more optimized with respect to speed with only a slight reduction in reliability.

Only a first positive individual pulse 34 is transmitted by the transmitter AT1. After the latency dly, the positive individual pulse 34 arrives at the receiver AR2 as the positive individual pulse 35, is checked and, in the event of a positive result, is acknowledged by the transmitter AT2 with the negative acknowledgement pulse 37 and, after a further latency dly, is received by the receiver AR1 as the negative individual pulse 36. In this case, the production of a DC voltage component is thus suppressed by transmitting an acknowledgement pulse having a polarity opposite that of the received pulse.

The latency dly is naturally the same as that with the first principle: 45 ns, but the transmission duration, including verification, is: 2*45 ns+2*10 ns=110 ns, which allows a maximum of 9.09 million events per second or allows a maximum speed of 9.09 m/s with a resolution of 1 μm for a drive shaft. That is to say, the second principle is approximately 18% faster than the first principle. It is again clear here that the total signal propagation time of 90 ns with secure transmission over cables having a length of 8 m is dominant and thus limits the maximum line length in purely physical terms. Cat. 6 or Cat. 6a cables would provide only an insignificant improvement in this case since they have a similar propagation speed to the Cat. 5 cable.

In the event of a transmission error, the transmitter AT1 must also transmit the second (negative) individual pulse 37 in order to restore the equilibrium of the signal voltage. This results at least in a time delay of an additional 10 ns. In addition, the reception of the second pulse 37 by the receiver AR2 must not be classified as a new event.

This method is therefore more suitable for low-interference transmission paths, and error handling should form the exception for this embodiment, otherwise the loss of reliability in comparison with the first principle is not worthwhile.

In some embodiments, collisions of individual pulses may also be detected, for example, by virtue of the fact that an individual pulse has been received on a receiver side in the receiver 24, 25, even though the associated transmitter 22, 23 at the same end of the data cable has not transmitted an individual pulse. In the case of such a detected collision, it is pointless to retransmit in some embodiments, from the technical point of view. Therefore, in order to also prevent incorrect processing, the transmitter 22, 23 is accordingly immediately switched to the basic state "no event" in some embodiments. In the normal case, an acknowledgement message is not transmitted since the received data are too unreliable. The aborted transmission attempt can be transmitted a second time with a time delay, depending on requirements. Alternatively, the transmission can simply be omitted.

In some embodiments, reports of stochastic events are transmitted via more than one station. For example, individual pulses can be transmitted from the module 8 "Drive" (FIG. 1) on to the control module 2 "CNC" via the node 5. In order to keep the delay times as short as possible, those individual pulses which are not directly intended for the first receiver and consequently run via more than one station are directly redirected to the next transmitter by the first receiver via a logic circuit 11 (FPGA_N) in some embodiments. This direct redirection of the individual pulses is organized by control systems in the node 5 itself or by superordinate systems via the Ethernet connection 3'. More precisely, these control systems in this case cause the logic circuit FPGA_N 11 to directly connect the inputs +/−AR1 and +/−BR1 of the differential receivers 24, 25 to the corresponding outputs +/−AT1 and +/−BT1 to the line drivers 22, 23. This results only in the very small time losses of the input and output blocks of the logic circuit FPGA_N 11.

In the present embodiment with star-type cabling, the direct redirection could be used, in principle, solely in the node 5. Nevertheless, in certain cases, direct redirection may be useful in a module 2 or 8 in order to directly return reports received via the inputs +/−AR2 and +/−BR2 of the logic circuit FPGA_M 12 via the outputs +/−BT2 and +/−AT2. In other words, in some embodiments, a transmission received from the A_LINK is returned immediately and without modification via the B_LINK and, conversely, a transmission received from the B_LINK is returned in a corresponding manner via the A_LINK. Although this requires many resources in some embodiments, it provides two advantages: 1). a data collision is precluded, 2). the transmitter can already determine, after two signal propagation times of the transmission cable, that the transmission has arrived. In the embodiment according to FIG. 8, this would allow the maximum transmission rate to be increased from 6.69 million to 11.1 million events, that is to say an improvement of approximately 61%, which, however, costs 100% more resources.

At this point, reference is again made to the advantages of rapid digital data transmission in some embodiments for drive technology since such high update rates for the desired value and actual value positions enable completely new approaches for the control methods, in particular of machine tools such as electrical discharge machines.

Control methods which are increasingly oriented to the principle of ballistics and prognostics are considered to be promising. No terms are yet known for such methods and they are referred to as "ballistic drives" in the following discussion of embodiments.

Ballistic drives no longer move in a blind manner on the basis of an antiquated deviation from the calculated path geometry, but rather on the basis of a future position taking into account the deviation which has just been observed and is caused by interference variables such as mass, friction, machining forces, thermal influences, among many others. The likely influence on the future position is calculated and compensated for. The path corrections are also no longer carried out in a timing clock cycle but rather asynchronously at the optimum time and with precisely quantized pulses. Necessarily asynchronous position data in real time for desired and actual values are required for this purpose.

Space travel has always been based on ballistics, and the principle of path measurement and the precisely metered and temporally precisely determined path corrections has been known to a wide public at least since the Apollo moon landings.

Initial approaches in this direction are known from electrical discharge wire cutting. EP 801 341 B1 discloses path correction in order to eliminate the errors caused by the machining forces in areas of severe path curvature. The path correction is calculated in real time using the machining power.

EP 578 018 B1 discloses similar path correction for precision machining, a workpiece which has been accurately precut to a restricted extent being measured in real time and the path correction being derived therefrom. This also enables a high degree of surface quality over the entire contour for large workpieces.

EP 920 943 B1 discloses a precision machining method in order to avoid errors caused by electrostatic forces acting on the wire electrode. Deflection of the wire electrode is detected in real time and is compensated for via the path speed and the generator power.

There are various uses for such systems in mechanical engineering. For example, anti-collision systems become more effective if they can be based on a rapid item of position information and not only on an abnormal deviation from the desired value of the subordinate current control circuit. In some embodiments, the invention enables reliable collision detection in less than approximately 1 µs. At a speed of 10 m/s, only a distance of 10 µm is covered during this time. It is possible to prevent considerable damage if emergency braking succeeds in keeping the deformations of the structural parts of the machine in the elastic range. Following a collision, a provisional estimate of the damage can be immediately output using the profile of the emergency braking operation and using empirical values.

The effects of the position being reported only every 10 µs or 100 µs, for example, may consequently be considerable and a large amount of damage may be caused.

Another example is high-resolution and highly dynamic drive shafts if they are intended to be kept in a precise position despite interference. With known systems, this becomes a challenge since high precision requires a high loop gain which then often results in undesirable oscillations. There may be several reasons for this: changed friction values, changed mass, changed machining forces but usually obsolete actual values.

A ballistic drive is free of all of these problems. In some embodiments, the actuator may even be kept out of the position control circuit if the pulse quanta produced are guaranteed with sufficient accuracy and stability.

The highly dynamic ballistic drives are still in the early development stage. The present invention could make a valuable contribution to their commercialization.

All of the cited examples are used solely for the better understanding of the invention. Purely illustrative details should not be understood as being restrictive.

Some general explanations of the embodiments of the present invention follow.

It emerges from the above discussion of the embodiments that, in some embodiments, a known serial data link, for example ETHERNET, published in IEEE802.3, is expanded for the purpose of directly transmitting random events without having to carry out synchronization with a clock signal or having to wait for a cyclical transmission time. In this case, two different, random events, for example, can be represented using two differently coded individual pulses and can be transmitted in an event-controlled manner and without a clock. As a result of the freedom from a clock, synchronization and also delays until a data packet can be transmitted, which delays may occur on account of a clock rate, are dispensed with in some embodiments. A jitter-free latency of 45 ns between a stochastic event and its reception is possible in this case over a line length of 8 m, for example. As a result, some embodiments are particularly suitable for short, digital data links between a node and a plurality of modules, as are required in modern electrical discharge machines, machine tools and similar electronic systems.

As mentioned at the outset, some embodiments relate to a method for digital data transmission of stochastic events, in particular rapid digital data transmission of stochastic events.

In this case, the term "rapid" relates to data transmission operations based on a high propagation speed in a data cable which can typically be achieved with current cable types, such as Cat. 5 or more recent types, that is to say propagation speeds of 216 m/µs, for example.

In this case, the transmission speed is at the limit of the physically conditioned signal propagation times which can be transmitted over distances of up to approximately 10 m inside machine tools, in particular electrical discharge machines, or similar electronic systems.

In some embodiments, the solution according to the invention is generally based on serial data transmission systems having a plurality of twisted conductor pairs, but preferably on the known ETHERNET standard IEEE802.3. In some embodiments, the invention allows highly dynamic transmission of random events over predefined distances of up to approximately 10 m using idle resources and a novel application and modification of the known Manchester coding method.

In some embodiments, the data are transmitted in this case over a limited or predefined distance via a data cable, for example the abovementioned Cat. 5 cable, in a machine tool, in particular an electrical discharge machine, or a similar electronic system.

In this case, the predefined distance relates, for example, to the length of the data cable via which the data are transmitted. In some embodiments, typical lengths of the data cable are a few meters and, as mentioned, less than 10 meters, for example 8 meters, in some embodiments.

In this case, the data cable may be (partially) arranged inside a machine tool or else (partially) arranged outside a housing of the machine tool.

In some embodiments, the data cable has a plurality of twisted conductor pairs, at least one conductor pair being intended for serial data transfer. In some embodiments, the data transmission via the conductor pairs is also bidirectional. At least one further conductor pair is intended to transmit stochastic events, with the result that, in some embodiments, data transfer is possible in parallel with the transmission of stochastic events. In some embodiments, the stochastic events may also be transmitted in a bidirectional manner.

As mentioned above, stochastic events in this case are, for example, random events which may occur during electrical discharge processes. On account of the high machining speed and the high processing accuracy of a few micrometers, stochastic events must be able to be processed within a few hundred nanoseconds in some embodiments since otherwise the abovementioned high processing accuracy of a few micrometers cannot be achieved.

In some embodiments, the stochastic events may be represented in this case by data which, for example, represent either a particular (random) state or represent only the presence or absence of a stochastic event.

In some embodiments, the transmission of data is triggered virtually without delay as a result of the occurrence of the stochastic event. That is to say, in some embodiments, time delays before the data transmission of the stochastic event is triggered are produced only as a result of the processing inside a programmable logic arrangement.

In some embodiments, the stochastic event is signalled in this case by an individual pulse and is transmitted without a clock.

In a similar manner to that in the known Manchester coding, a separate clock signal consequently does not need to be transmitted in the case of the individual pulse coding used and synchronization with such a clock signal is also accordingly dispensed with in some embodiments. In addition, in some embodiments, the individual pulse coding is free of a DC voltage component, that is to say the DC voltage component is equal to zero. In contrast to the conventional Manchester coding, a continuous data stream and a continuous clock signal are not transmitted in some embodiments, but rather individual pulses are transmitted, for example as a result of the occurrence of a stochastic event.

In order to signal the stochastic events, individual pulses are coded in such a manner that they can signal at least two states. For this purpose, the individual pulse may be a positive pulse which signals a first stochastic event, for example, and the individual pulse may be a negative pulse which signals a second stochastic event. The absence of the individual pulses signals a basic state.

In some embodiments, following a first individual pulse, a second individual pulse with a polarity opposite that of the first individual pulse is directly transmitted. This makes it possible to prevent the occurrence of a DC voltage component, as discussed above.

In some embodiments, stochastic events are transmitted via one conductor pair for both directions or separately via two conductor pairs. In some embodiments, the operating mode and/or the type of event can be dynamically determined via the normal, serial (possibly bidirectional) data transfer which is transmitted via the conductor pairs of the data cable which are intended for the normal, serial data traffic.

In some embodiments, it is verified that a stochastic event is present. For this purpose, upon receiving the individual pulse, the signal integrity can be checked by checking the amplitude and the duration of the individual pulse, for example. This is possible since, in some embodiments, the amplitude and the duration of a valid individual pulse are known. In this case, the individual pulse may also be an individual pulse which is transmitted following a first individual pulse in order to suppress a DC voltage component.

The event is processed in the case of a positive result, that is to say if a stochastic event is present, and is acknowledged by a returned individual pulse. In contrast, in the event of a negative result, a stochastic event is not signalled or processed in some embodiments and no acknowledgement is transmitted. However, in some embodiments, the transmission error can be statistically detected and processed further. For example, in some embodiments, incorrect transmission which is based, for example, on a faulty data cable can be inferred from a statistical evaluation of the transmission error.

In some embodiments, upon receiving the individual pulse, the event is immediately processed. Only after this processing is it verified whether or not the stochastic event was present by checking an amplitude and duration of the individual pulse. In the event of a positive result, it is then acknowledged, by a returned individual pulse, that the stochastic event was actually present. In the event of a negative result, no acknowledgement is transmitted. As mentioned, a transmission error is determined in some embodiments in the event of the negative result. In addition, the processing of the event is reversed or corrected and/or the transmission error is statistically detected. As mentioned above, the statistical transmission error can be used for further processing and, for example, to detect a faulty data cable.

In some embodiments, only a first individual pulse is transmitted by the transmitter. A second individual pulse with a polarity opposite that of the first individual pulse is returned by the receiver as an acknowledgement of receipt after checking the signal integrity and in the event of a positive result for the signal integrity, that is to say if a transmission error is not present. If a transmission error is determined when verifying the signal integrity, no acknowledgement of receipt is transmitted. The transmitter transmits a second individual pulse with a polarity opposite that of the first individual pulse after the expiry of a predefined time in order to again compensate for the DC voltage potential and to prevent charging. In some embodiments, the processing of the stochastic event is reversed or corrected and/or statistically detected. In these embodiments, the latency is shorter overall since only one individual pulse is first of all transmitted and the DC voltage signal is compensated for by transmitting a corresponding individual pulse with a polarity opposite that of the first individual pulse as an acknowledgement signal.

In some embodiments, the gap between the end of the transmitted individual pulse and the start of the received acknowledgement pulse, which is caused by the signal propagation time, is likewise measured in the transmitter. The signal propagation time can be evaluated as an additional criterion for the data integrity and/or as a measure of the quality of the transmission path for diagnostic purposes.

In some embodiments, reports of stochastic events which are intended to be transmitted via more than one transmission path or more than one station are directly redirected to a next transmitter by the first receiver via a logic circuit. This makes it possible to rapidly transmit the reports since the report is not processed further in the first receiving station but only in the station for which the report is intended.

Some embodiments relate to an apparatus for (rapid) digital data transmission of stochastic events, which apparatus is set up to at least partially carry out the methods discussed above.

The stochastic events are transmitted, for example over a limited or predefined distance, in a machine tool or a similar electronic system via a data cable. In this case, the predefined distance is predefined by the length of the data cable, for example.

As mentioned above, the data cable has a plurality of twisted conductor pairs, at least one conductor pair of which is intended for serial data transfer (bidirectional data transfer in some embodiments), and at least one further conductor pair is intended to transmit stochastic events.

The apparatus also has at least one transmitting device and at least one receiving device which are each coupled at one end of the data cable. In this case, the transmitting and receiving devices are at opposite ends of the data cable, with the result that the receiving device can receive signals from the transmitting device. Both the transmitting device and the receiving device are each coupled to a logic circuit which is programmable in some embodiments.

The at least one transmitting device is designed in such a manner that it can transmit individual pulses without a clock, as described above. In this case, as described above, an individual pulse can be a "positive pulse" or a "negative pulse". A positive pulse signals, for example, a first stochastic event, a negative pulse signals a second stochastic event and the absence of an individual pulse signals that there is no stochastic event (as described above).

In this case, for the purpose of receiving stochastic events, the receiving device is designed in such a manner that it can detect the three states "positive pulse", "negative pulse" and "no event" by receiving or not receiving corresponding individual pulses.

In some embodiments, the at least one transmitting device is coupled to the corresponding conductor pairs for transmitting stochastic events via at least one line terminating resistor. In some embodiments, the transmitting devices remain coupled to the conductor pairs of the data cable, which are used to transmit the stochastic events, via the line terminating resistors for all three states.

In some embodiments, both the at least one transmitting device and the at least one receiving device for stochastic events are designed for bidirectional data transmission. In some embodiments, the transmitting and receiver devices are also structurally identical at both ends of the data cable, thus enabling a cost-effective and simple design of the apparatus. In some embodiments, at least one transmitting device and one receiving device are provided at each end of the data cable for bidirectional data interchange.

In some embodiments, the at least one receiving device for stochastic events is designed for the continuous reception of stochastic events. In some embodiments, the at least one receiving device is also coupled or connected to the at least one transmitting device for stochastic events via the (programmable) logic circuits. In some embodiments, upon receiving a stochastic event, the logic circuits immediately switch the associated transmitting device to the "no event" state if the transmitting device on the side of the receiving device has simultaneously transmitted an individual pulse and consequently there may be a collision between the individual pulse received by the receiving device and the individual pulse transmitted by the transmitting device.

In some embodiments, the apparatus is designed according to the IEEE802.3 and/or IEEE802.3at standard. In addition, in some embodiments according to the above standards, unused conductor pairs of a Cat. 5 data cable of the standardized transmission path are intended to transmit the stochastic events.

In some embodiments, the apparatus has at least one transmitting transformer and at least one receiving transformer. DC voltage transmission operations for supplying energy to the receiver side via centre taps of the transmitting transformers and of the receiving transformers are conducted via all four conductor pairs of the Cat. 5 data cable. In addition, in some embodiments, no rectifier bridges are provided on the receiver side for polarity correction.

In some embodiments, an electrical discharge machine has an apparatus which is at least partially configured as described above and, in some embodiments, the electrical discharge machine is (additionally) designed to at least partially carry out the methods described above.

In this case, the electrical discharge machine has the parts of an electrical discharge machine which are known to a person skilled in the art. The electrical discharge machine also has a central node, a plurality of modules which are intended and designed to control the electrical discharge machine, and at least one data cable as described above which connects at least one module to the central node.

In some embodiments, as stated above, the stochastic events represent states (for example Discharge, Short, Open) of a spark gap and/or the desired value and actual value transmission for a drive shaft of the electrical discharge machine in the form of travel increments (Forward, Backward, Stop).

The described methods and apparatuses are particularly suitable for the highly dynamic transmission of stochastically occurring events over the short distances of less than approximately 10 m in machine tools, in particular electrical discharge machines, or similar electronic systems without, however, being restricted thereto.

The main field of application is therefore in machine tool construction and similar, spatially limited electronic systems.

The invention claimed is:

1. A method for digital data transmission of stochastic events in a machine tool, comprising the steps of:
    providing a data cable comprising a plurality of twisted conductor pairs;
    configuring at least one of the plurality of twisted conductor pairs for serial data transfer;
    configuring at least another of the plurality of twisted conductor pairs for transmitting stochastic events;
    signalling stochastic events by a first individual pulse transmitted by the another twisted conductor pair without a clock; and
    providing as a first individual pulse one of a positive and negative pulse for signalling a first stochastic event and the other of the positive and negative pulse for signalling a second stochastic event, wherein the absence of an individual pulse signalling no event.

2. A method according to claim 1, wherein, following transmission of the first individual pulse, a second individual pulse with a polarity opposite that of the first individual pulse is transmitted.

3. A method according to claim 1, wherein stochastic events are transmitted via one conductor pair (A_LINK, B_LINK) for both directions or separately via two conductor pairs (A_LINK, B_LINK), and in which an operating mode and/or a type of event is/are dynamically determined via the normal, serial, bidirectional data transfer.

4. A method according to claim 1, wherein, upon receiving the first transmitted individual pulse (30), signal integrity is verified by checking an amplitude and a duration of the first individual pulse, and the event is processed following a positive result and is acknowledged by a returned individual pulse (32), wherein, in the event of a negative result, the event is not processed and no acknowledgement is transmitted but a transmission error is statistically detected.

5. A method according to claim 1, wherein, upon receiving the first transmitted individual pulse (30), the event is immediately processed and signal integrity is only then verified by checking an amplitude and a duration of a first individual pulse and/or a second individual pulse and, in the event of a positive result, is acknowledged by a returned individual pulse (32), and, in the event of a negative result, no acknowledgement is transmitted and the processing of the event is reversed or corrected and/or the error is statistically detected.

6. A method according to claim 1, wherein only a first individual pulse (34) is transmitted by a transmitter (22, 23), and, if no transmission error is determined when verifying signal integrity, a second individual pulse (36) with a polarity opposite that of the first individual pulse (34) is returned by the receiver (24, 25) as an acknowledgement of receipt, and, if a transmission error is determined when verifying the signal integrity, no acknowledgement of receipt is returned, the transmitter (22, 23) transmitting the second individual pulse (36) with a polarity opposite that of the first individual pulse (34) after the expiry of a predefined time in which the transmitter has not detected an acknowledgement of receipt after emitting the first individual pulse (34), the transmission error being statistically detected.

7. A method according to claim 6, wherein a gap between an end of the first transmitted pulse (30) and a start of the received acknowledgement pulse (32), which is caused by the signal propagation time, is measured in the transmitter and is evaluated as an additional criterion for the signal integrity and/or as a measure of the quality of the transmission path for diagnostic purposes.

8. A method according to claim 1, wherein reports of stochastic events which are intended to be transmitted via more than one station are directly redirected to the next transmitter by the first receiver via a logic circuit (11, FPGA_N).

9. An apparatus for digital data transmission of stochastic events in a machine tool comprising a data cable (6) having a plurality of twisted conductor pairs, at least one conductor pair (UP_LINK, DOWN_LINK) configured for serial data transfer, at least one further conductor pair (A_LINK, _BLINK) configured to transmit stochastic events, a transmitting device (22, 23) coupled at least at one end of the data cable and a receiving device (24, 25) coupled at an opposite end of the data cable (6), the transmitting and receiving devices are connected to associated logic circuits (11, FPGA_N, 12, FPGA_M), wherein, for signalling stochastic events, the at least one transmitting device (22, 23) is designed to transmit individual pulses without a clock, an individual pulse state being able to be a positive pulse or a negative pulse, wherein a positive pulse signalling a first stochastic event, a negative pulse signalling a second stochastic event and the absence of an individual pulse signalling no event, and the at least one receiving device (24, 25) for receiving the individual pulses is designed to detect the pulse state of positive pulse, negative pulse and no pulse.

10. An apparatus according to claim 9, wherein the at least one transmitting device (22, 23) is coupled to the corresponding conductor pairs (A_LINK, B_BLINK) for transmitting stochastic events via at least one line terminating resistor (26, 27).

11. An apparatus according to claim 9, wherein at least one transmitting device (22, 23) and at least one receiving device (24, 25) for transmitting stochastic events are provided and coupled at each end of the data cable in order to allow bidirectional data transmission via the data cable (6), and the at least one transmitting device (22, 23) and the at least one receiving device (24, 25) are structurally identical at both ends of the data cable (6).

12. An apparatus according to claim 11, wherein the at least one receiving device (24, 25) for stochastic events is designed for continuous reception and is connected to the at least one transmitting device (22, 23) for stochastic events via the logic circuits (11, FPGA_N, 12, FPGA_M), and, upon receiving a stochastic event, the logic circuits (11, FPGA_N, 12, FPGA_M) immediately switch the associated transmitting device (22, 23) to the "no event" state if the transmitting device (22, 23) on the side of the receiving device (24, 25) has simultaneously transmitted an individual pulse and consequently there may be a collision between the individual pulse received by the receiving device (24, 25) and the individual pulse transmitted by the transmitting device (22, 23).

13. An apparatus according to claim 9, wherein the apparatus being designed according to either of the IEEE802.3 and IEEE802.3at standards, the data cable (6) being a Cat. 5 data cable, and unused conductor pairs of the Cat. 5 data cable of the standardized transmission path being intended to transmit the stochastic events.

14. An apparatus according to claim 13, wherein the apparatus having at least one transmitting transformer (15) and at least one receiving transformer (19), DC voltage transmission operations for supplying power to the receiver side via centre taps (16, 18, 28, 29) of the at least one transmitting transformer (15) and of the at least one receiving transformer (19) being conducted via all four conductor pairs of the Cat. 5 data cable, and no rectifier bridges being provided on the receiver side for polarity correction.

15. An electrical discharge machine comprising:
a central node (5),
a plurality of modules (2, 8) configured to control an electrical discharge machine, and
at least one data cable (6) which connects at least one module (2, 8) to the central node (5), the electrical discharge machine having an apparatus for digital data transmission of stochastic events in a machine tool via the data cable (6) comprising a plurality of twisted conductor pairs, at least one conductor pair (UP_LINK, DOWN_LINK) of which is intended for serial data transfer, at least one further conductor pair (A_LINK, B_LINK) is configured to transmit stochastic events, a transmitting device (22, 23) being provided and coupled at least at one end of the data cable and a receiving device (24, 25) being provided and coupled at an opposite end of the data cable (6), the transmitting and receiving devices are connected to associated logic circuits (11, FPGA_N, 12, FPGA_M), and the at least one transmitting device (22, 23) for signalling stochastic events transmits individual pulses without a clock, an individual pulse state being able to be a positive pulse or a negative pulse, wherein a positive pulse signalling a first stochastic event, a negative pulse signalling a second stochastic event and the absence of an individual pulse signalling no event, and the at least one receiving device (24, 25) for receiving the individual pulses is designed in such a manner that it can detect the pulse states of positive pulse, negative pulse and no event pulse.

16. An electrical discharge machine according to claim 15, wherein the stochastic events represent states of a spark gap and/or representing the desired value and actual value transmission in the form of travel increments for a drive shaft of the electrical discharge machine.

* * * * *